United States Patent [19]

Kazenmaier et al.

[11] 4,417,549

[45] Nov. 29, 1983

[54] SEALING ARRANGEMENT FOR WET CYLINDER LINERS

[75] Inventors: Ulrich Kazenmaier, Wendeburg; Günter Quast, Brunswick, both of Fed. Rep. of Germany

[73] Assignee: M.A.N. Maschinenfabrik Augsburg-Nuremberg Aktiengesellschaft, Nuremberg, Fed. Rep. of Germany

[21] Appl. No.: 354,143

[22] Filed: Mar. 5, 1982

[30] Foreign Application Priority Data

Mar. 6, 1981 [DE] Fed. Rep. of Germany ....... 3108412

[51] Int. Cl.³ ................................................ F01P 3/02

[52] U.S. Cl. .................................................. 123/41.84

[58] Field of Search ................... 123/668, 669, 193 R, 123/193 C, 41.83, 41.84

[56] References Cited

U.S. PATENT DOCUMENTS 3,382,858 5/1968 Gallois et al. .................. 123/193 R 4,305,348 12/1981 Martin ............................ 123/41.84

*Primary Examiner*—William A. Cuchlinski, Jr.

*Attorney, Agent, or Firm*—Becker & Becker, Inc.

[57] ABSTRACT

A sealing system is intended for wet cylinder liners and having a flange seat on the crankcase of internal combustion engines. Sealing rings are respectively provided in the recess and in an annular groove arranged in the area of the upper guiding portion of the liner. The annular groove should not reduce the length of the guiding portion by more than 40%. In this manner, salt crystals forming as cooling water evaporates are prevented from penetrating up to the top sealing ring, so that this ring will not be corroded, and its sealing action is maintained.

2 Claims, 1 Drawing Figure

1

6

4

12

5

2a

9

3

13

10

14

8

15

9

16

7

2

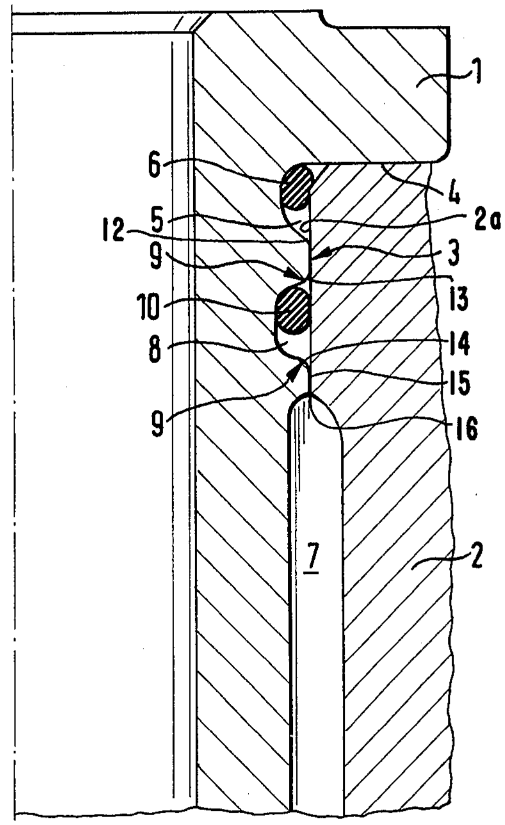
1
6
4
5
2a
12
3
9
13
10
14
8
15
9
16
7
2

SEALING ARRANGEMENT FOR WET CYLINDER LINERS

The present invention relates to a sealing system for a wet cylinder liner having a flange seat on the cylinder head deck of the crankcase of an internal combustion engine, with a sealing ring arranged by press-fit directly in a recess between the upper guiding portion and the flange seat.

Such sealing arrangements for the top part of wet cylinder liners adjacent to the cylinder head have long been part of the art. In this arrangement, the top guiding portion of the cylinder liner follows directly below the sealing ring and, in order to provide good guidance, this portion is required to be long enough and to provide good contact with the crankcase. On the other hand, this contact area must not be too long, because otherwise the cooling water space would be displaced too far downwards and insufficient cooling would result for the top portion of the liner, which is the part exposed to the greatest stresses.

Even where good contact of the guiding portion exists, it cannot be avoided that cooling water, which has a temperature of as high as 130° to 140° Celsius, penetrates into the gap and reaches to the sealing ring. Since no venting facility exists, the water has to evaporate at these temperatures, whereby aggressive salt crystals tend to form, which eventually will attack and literally eat away the sealing ring, permitting water to reach as far as the flange seat between the crank case and the liner. As a consequence, cooling water leakages are liable to occur, which can be remedied only by complex and costly repairs.

Furthermore, any access of cooling water to the flange seat also causes this highly stressed area to be subjected to corrosive attack and destruction in the course of time, causing the liner contact surface to be worn away, whereby the liner may descend, which again can be remedied only by a complex repair which generally involves remachining the crank case.

This is the starting point of the present invention, which has for its object to provide with simple means a reliable top seal of the cooling water space without the need to relocate it further downwards in order to achieve good contact and/or guidance of the liner.

This object and other objects and advantages of the present invention, will appear more clearly from the following specification in connection with the accompanying drawing in which:

The FIGURE of the drawing is a fragmentary cross-section view of a sealing arrangement having feature according to the present invention.

According to the invention, this object is achieved by providing an additional annular groove in the area of the upper guiding portion of the liner, and arranging a second sealing ring in this groove.

In other words, two sealing rings are provided in tandem, so that the upper sealing ring is positively prevented from coming into contact with the cooling water, and the guiding portion itself remains free from exposure to water over a certain length, whereby the formation of aggressive salt crystals is eliminated to a large extent. This ensures a life at least double as long, and the drawbacks referred to initially are completely avoided.

The width of the groove is preferably made greater than its depth—although this is not a requirement—, so that as the liner is pressed in place, the sealing ring undergoes some skewing and deformation.

As a further development of the invention, it is proposed to form the groove for the second sealing ring with rounded-off portions or radii at its sides in order to reduce or prevent tearing effects.

Finally it is further proposed according to the invention that the length of the upper guiding portion of the liner be reducable by the additional annular groove by 40% maximum. This feature ensures that adequate guidance of the liner is maintained and prevents the need for the cooling water space to be relocated further downwards.

Details of the invention follow from the description of a typical embodiment of the invention illustrated in the drawing and set forth below to facilitate understanding of the features of the sealing arrangement for the wet cylinder liner.

The FIGURE illustrates a fragmentary cross of a portion of the cylinder liner 1, which is inserted in a crankcase 2. The liner 1 bears with a flange seat 4 on the cylinder head deck of the crankcase 2 and, in the radial direction, contacts the bore in the crankcase 2 with a guiding portion 3.

A sealing ring 6 is jammed in place directly in the recess 5 between the upper guiding portion 3 and the flange seat 4. In order to protect the sealing ring 6 from the cooling water provided in the cooling water space 7, an additional annular groove 8 is formed in the area of the upper guiding portion 3 of the liner 1; this additional annular groove 8 is formed with rounded-off portions or radii 9, and a sealing ring 10 is also jammed in place in this additional annular groove 8. The maximum width of the annular groove 8 should not reduce the length of the guiding portion 3 by more than 40% in order to guarantee adequate guidance. If the total length of the guiding portion 3 is, for instance, 7.65 mm, then the minimum length of about 4.65 mm must be maintained.

Considering the structure of the drawing more specifically, the crankcase 2 has a straight cylindrical wall portion 2a which is integral with the crankcase and faces inwardly toward the cylinder liner 1. The recess 5 forms a first annular groove in the cylinder liner 1 starting at the junction of the flange 4 with the vertical portion of the cylinder liner and extending toward the cooling space 7. This first annular groove or recess 5 opens toward the straight cylindrical wall 2a of the crankcase 2 and terminates in a first line of contact seen in the drawing as a point 12, which first line of contact has a diameter equal to the diameter of the straight cylindrical wall 2a in that the line of contact interfaces with the straight cylindrical wall.

The sealing ring 6 forms a first ring positioned within the recess or first annular groove 5 and is compressed between the surface of the groove and straight cylindrical wall. The guiding portion 3 on the cylinder liner 1 has a diameter equal to that of the straight cylindrical wall 2a and extends a first distance from the first line of contact 12 toward the cooling space 7 to a second line of contact identified by the point 13 to define a guiding surface which engages the straight cylindrical wall.

The additional annular groove 8, or second annular groove, extends from the second line of contact 13 toward the cooling space 7. The second annular groove 8 opens toward the straight cylindrical wall 2a and terminates at a third line of contact, identified by the point 14, with the straight cylindrical wall. The second annular groove 18 approaches the second and third lines of contact 13 and 14, respectively, along the convex surfaces 9. The second sealing ring 10 is positioned in the second groove 8 and is compressed between the surface defining the second groove and the straight cylindrical wall 2*a* to isolate the first sealing ring 6 from the cooling space 7.

A second guiding portion 15 on the cylinder liner 1 having a diameter equal to that of the straight cylindrical wall 2*a* extends a second distance from the third line of contact 14 toward the cooling space 7 to a fourth line of contact, identified by the point 16, so as to define a second guiding surface which engages the straight cylindrical wall proximate the cooling space. As mentioned above, the second groove 8 has a width which extends a distance of not more than 40% of the total distance between the first and fourth lines of contact 12 and 16, respectively.

The present invention is, of course, in no way restricted to the specific disclosure of the specification and drawings, but also encompasses any modifications within the scope of the appended claims.

What we claim is:

1. In a wet cylinder liner used with an internal combustion engine, wherein the cylinder liner has a flange which abuts the cylinder head deck of the crankcase of the engine along a contact surface disposed in spaced relation to a cooling space defined between the crankcase and liner and positioned in spaced relation with respect to the contact surface, a sealing arrangement comprising:

a straight cylindrical wall integral with and on the crankcase facing inwardly toward the cylinder liner;

a first annular groove in the cylinder liner starting at the junction of the flange and extending toward the cooling space, the first annular groove opening toward the straight cylindrical wall of the crankcase and terminating at a first line of contact defining a diameter equal to the diameter of the straight cylindrical wall;

a first sealing ring in the first annular groove and being compressed between the groove and straight cylindrical wall;

a guiding portion on the cylinder liner having a diameter equal to that of the straight cylindrical wall and extending a first distance from the first line of contact toward the cooling space to a second line of contact to define a guiding surface which engages the straight cylindrical wall;

a second annular groove extending from the second line of contact toward the cooling space, the second annular groove opening toward the straight cylindrical wall and terminating at a third line of contact with the straight cylindrical wall, the second annular groove approaching the second and third lines of contact along convex surfaces;

a second sealing ring positioned in the second groove and being compressed between the surface defining the second groove and the straight cylindrical wall to isolate the first sealing ring from the cooling space, and a second guiding portion on the cylinder liner having a diameter equal to that of the straight cylindrical wall and extending a second distance from the third line of contact toward the cooling space to a forth line of contact to define a second guiding surface which engages the straight cylindrical wall proximate the cooling space.

2. The sealing arrangement of claim 1 wherein the second groove has a width which extends a distance of not 40% of the total distance between the first and fourth lines of contact.

* * * * *